United States Patent
Byrne et al.

(10) Patent No.: US 8,684,606 B2
(45) Date of Patent: Apr. 1, 2014

(54) HYDRODYNAMIC BEARING WITH ADAPTIVE DISPLACEMENT CONTROL

(75) Inventors: Thomas R. Byrne, Port Washington, WI (US); Thomas H. Stietz, Port Washington, WI (US)

(73) Assignee: Orion Corporation, Grafton, WI (US)

( * ) Notice: Subject to any disclaimer, the term of this patent is extended or adjusted under 35 U.S.C. 154(b) by 522 days.

(21) Appl. No.: 12/878,792

(22) Filed: Sep. 9, 2010

(65) Prior Publication Data

US 2012/0063711 A1    Mar. 15, 2012

(51) Int. Cl.
*F16C 32/06* (2006.01)
*F16C 17/04* (2006.01)

(52) U.S. Cl.
USPC .................. 384/122; 384/307; 384/308

(58) Field of Classification Search
USPC ............. 384/99, 117, 122, 306–312, 224
See application file for complete search history.

(56) References Cited

U.S. PATENT DOCUMENTS

| | | |
|---|---|---|
| 2,748,461 A | 6/1956 | Ohlsson |
| 2,751,266 A | 6/1956 | Palmgren et al. |
| 2,822,224 A | 2/1958 | Baker |
| 3,635,126 A | 1/1972 | Engel et al. |
| 3,658,393 A | 4/1972 | Luthi |
| 3,697,142 A | 10/1972 | Fortier |
| 3,791,703 A | 2/1974 | Ifield |
| 3,799,628 A | 3/1974 | Van Gaasbeek et al. |
| 3,836,215 A | 9/1974 | Dopkin et al. |
| 3,960,417 A | 6/1976 | Kraus |
| 3,994,367 A | 11/1976 | Christ |
| 4,073,549 A | 2/1978 | Christ et al. |
| 4,099,802 A | 7/1978 | Heinemann et al. |
| 4,106,824 A | 8/1978 | Meystre et al. |
| 4,227,865 A | 10/1980 | Erickson et al. |
| 4,239,300 A * | 12/1980 | Adler .......................... 384/120 |
| 4,306,754 A | 12/1981 | Kraus |
| 4,310,204 A | 1/1982 | Christ et al. |
| 4,333,692 A | 6/1982 | Kraus |
| 4,342,488 A | 8/1982 | Anderson et al. |
| 4,392,751 A | 7/1983 | Ida et al. |
| 4,404,724 A | 9/1983 | Christ et al. |
| 4,509,804 A | 4/1985 | Klusman |
| 4,514,887 A | 5/1985 | Rauf et al. |
| 4,540,221 A | 9/1985 | Frazer |
| 4,544,285 A | 10/1985 | Shaprio et al. |
| 4,626,111 A | 12/1986 | Swasey et al. |
| 4,726,691 A | 2/1988 | Lehmann |
| 4,749,282 A | 6/1988 | Spargo et al. |
| 4,840,498 A | 6/1989 | Lichtfuss |
| 4,864,703 A | 9/1989 | Biondetti et al. |

(Continued)

OTHER PUBLICATIONS

PCT/US2011/048461 International Search Report and Written Opinion dated Jan. 17, 2012, 11 pages.

*Primary Examiner* — Alan B Waits

(74) *Attorney, Agent, or Firm* — Michael Best & Friedrich LLP

(57) ABSTRACT

A hydrodynamic bearing includes a housing defining a central axis, a pad slidable relative to the housing in a direction substantially parallel to the central axis, a cylinder defined in one of the housing and the pad, a lubricant port in fluid communication with the cylinder, and a piston at least partially positioned in the cylinder. The piston is movable within the cylinder between a retracted position and an extended position in response to a flow of lubricant through the lubricant port to vary an axial spacing between the pad and the housing.

17 Claims, 5 Drawing Sheets

(56) References Cited

U.S. PATENT DOCUMENTS

| | | |
|---|---|---|
| 4,915,510 A | 4/1990 | Arvidsson |
| 4,952,076 A | 8/1990 | Wiley, III et al. |
| 4,970,767 A | 11/1990 | Link |
| 5,071,262 A | 12/1991 | Monzel et al. |
| 5,101,544 A | 4/1992 | Kubik |
| 5,149,206 A | 9/1992 | Bobo |
| 5,188,375 A | 2/1993 | Pope et al. |
| 5,207,511 A | 5/1993 | Bobo |
| 5,215,384 A | 6/1993 | Maier |
| 5,219,447 A | 6/1993 | Arvidsson |
| 5,228,378 A | 7/1993 | Bathory |
| 5,244,285 A | 9/1993 | Hagstedt et al. |
| 5,316,391 A | 5/1994 | Monzel |
| 5,344,239 A | 9/1994 | Stallone et al. |
| 5,360,273 A | 11/1994 | Buckmann |
| 5,374,129 A | 12/1994 | Vohr et al. |
| 5,692,838 A | 12/1997 | Yoshimoto et al. |
| 5,795,076 A | 8/1998 | Ball et al. |
| 5,797,684 A | 8/1998 | Becker |
| 5,879,085 A | 3/1999 | Ball et al. |
| 6,017,168 A | 1/2000 | Fraser, Jr. et al. |
| 6,637,942 B2 | 10/2003 | Dourlens et al. |
| 6,746,152 B2 * | 6/2004 | Branagan ............ 384/122 |
| 6,776,530 B2 | 8/2004 | Vimpari |
| 7,018,103 B2 | 3/2006 | Roeders |
| 7,329,048 B2 | 2/2008 | Klusman et al. |
| 7,517,152 B1 | 4/2009 | Walsh |
| 7,611,286 B2 | 11/2009 | Swann et al. |
| 7,758,247 B2 | 7/2010 | Geiger |

\* cited by examiner

HYDRODYNAMIC BEARING WITH ADAPTIVE DISPLACEMENT CONTROL

FIELD OF THE INVENTION

The present invention relates to bearings, and more particularly to hydrodynamic bearings.

BACKGROUND OF THE INVENTION

There are instances in which, during the operation of rotating machinery, the magnitude of the resultant force acting on a shaft may vary significantly, and its direction of application projected in the axial direction of the shaft may reverse. As a result, two opposed thrust bearings are typically used to restrain the axial motion of the shaft. One of the thrust bearings (i.e., the "active" thrust bearing) supports the axial loading of the shaft during nominal continuous operation of the rotating machinery. The function of the other thrust bearing (i.e., the "inactive" thrust bearing) is limited to supporting transient axial load on the shaft opposite in direction to the nominal continuous operating axial load. Transient axial or thrust loading on the shaft may cause the shaft to vibrate excessively, which may ultimately trigger the automatic shutdown of the rotating machinery.

Prior art methods of preventing or containing the development of such excessive vibration in rotating machinery due to transient axial movements of the shaft include supplying a flow rate of lubricant that is in excess of the amount needed to satisfy the hydrodynamic requirement of each thrust bearing in an attempt to completely fill the axial clearance gaps between the interfacing features of the shaft and the corresponding load-carrying surfaces of active and inactive thrust bearings. These prior art methods, however, contribute to increasing the parasitic power loss in the rotating machinery due to additional lubricant shearing, churning, and pumping losses.

SUMMARY OF THE INVENTION

The present invention provides, in one aspect, a hydrodynamic bearing including a housing defining a central axis, a pad slidable relative to the housing in a direction substantially parallel to the central axis, a cylinder defined in one of the housing and the pad, a lubricant port in fluid communication with the cylinder, and a piston at least partially positioned in the cylinder. The piston is movable within the cylinder between a retracted position and an extended position in response to a flow of lubricant through the lubricant port to vary an axial spacing between the pad and the housing.

The present invention provides, in another aspect, a hydrodynamic bearing assembly including a rotating component including a first bearing surface, and a hydrodynamic bearing. The hydrodynamic bearing includes a housing defining a central axis, and a pad slidable relative to the housing in a direction substantially parallel to the central axis and having a second bearing surface in facing relationship with the first bearing surface. The first and second bearing surfaces define therebetween a lubrication zone in which lubricant is maintained. The hydrodynamic bearing also includes a cylinder defined in one of the housing and the pad, a lubricant port in fluid communication with the cylinder and the lubricant zone, and a piston at least partially positioned in the cylinder. The piston is movable within the cylinder between a retracted position and an extended position in response to a bi-directional flow of lubricant through the lubricant port to vary an axial spacing between the pad and the housing.

The present invention provides, in yet another aspect, a method of adapting the position of a bearing surface of a hydrodynamic bearing relative to a rotating component. The method includes providing a space between a housing and a pad of the hydrodynamic bearing, and selectively introducing pressurized fluid into the space to displace the pad, and therefore the bearing surface, relative to the housing.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
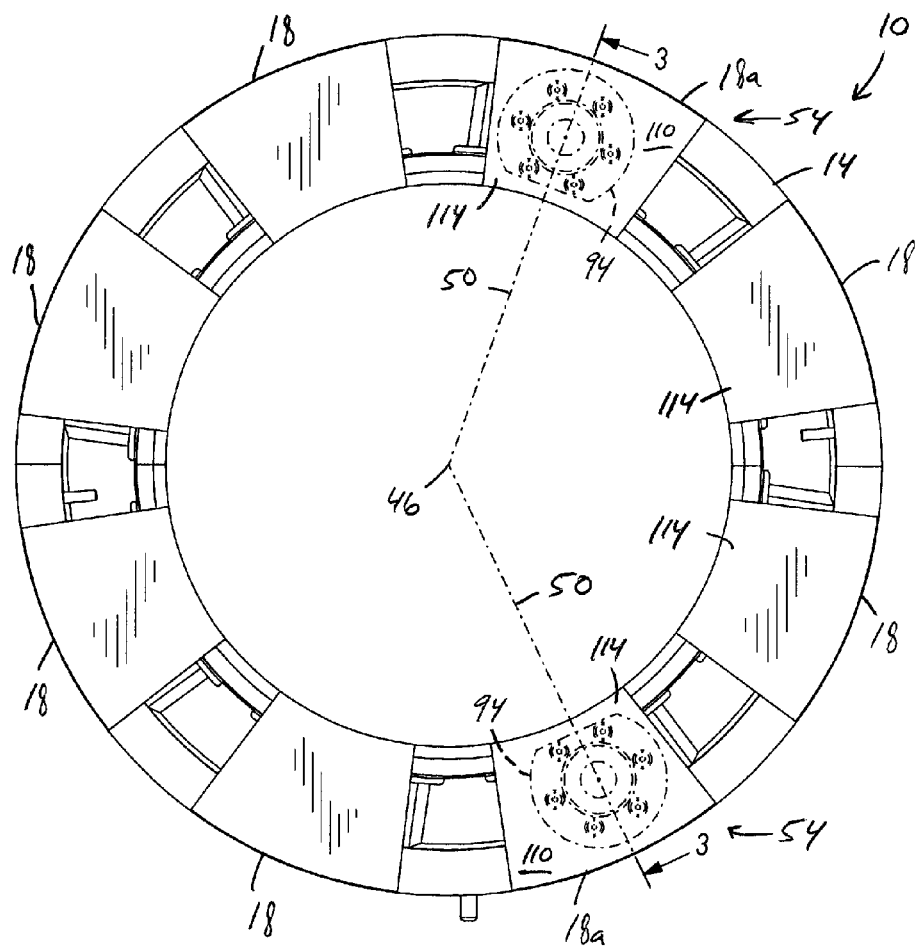
FIG. 1 is a front view of a hydrodynamic bearing of the present invention.
Figure 2:
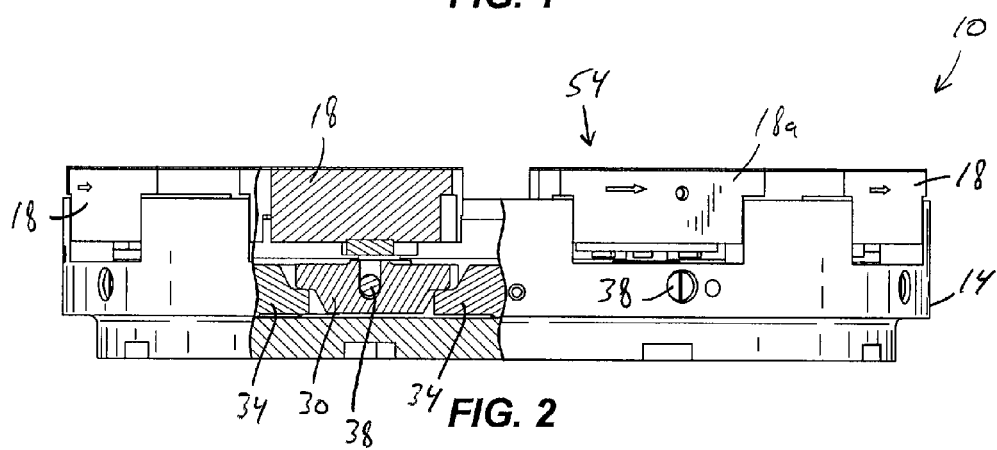
FIG. 2 is a side, partial cutaway view of the hydrodynamic bearing of FIG. 1.
Figure 3:
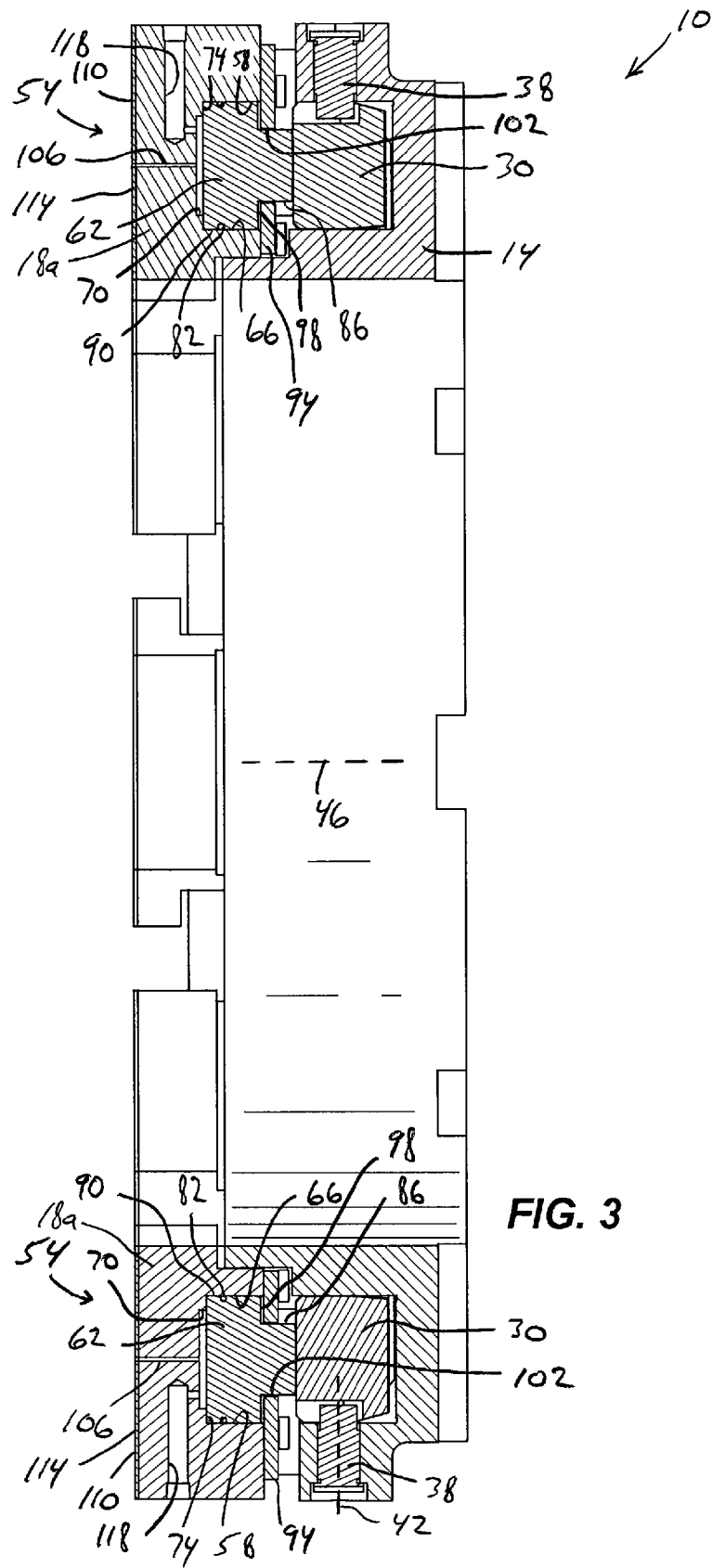
FIG. 3. is a cross-sectional view of the hydrodynamic bearing of FIG. 1, taken along line 3-3 in FIG. 1.
Figure 4:
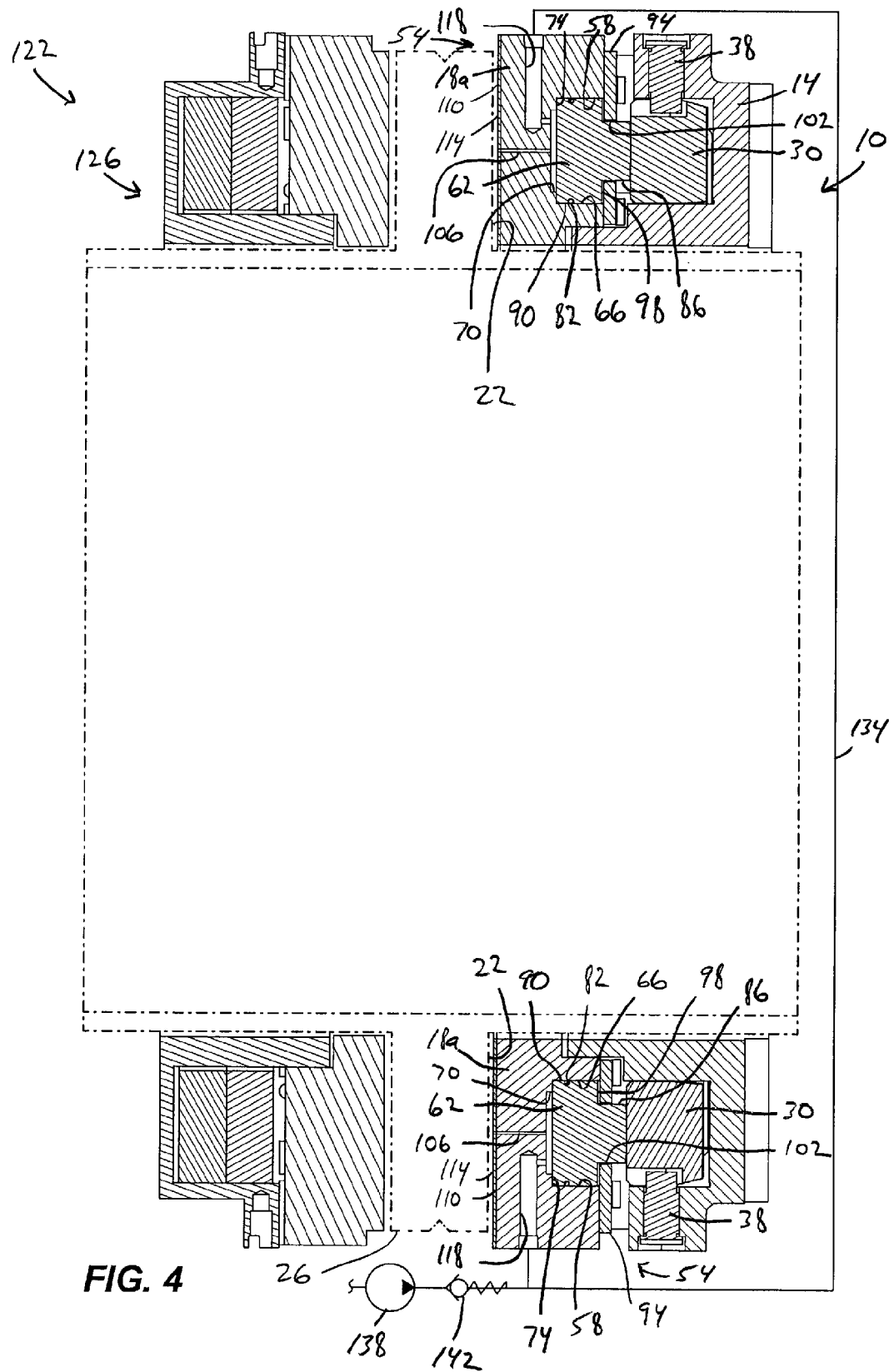
FIG. 4 is a cross-sectional view of a hydrodynamic bearing assembly including a rotating component positioned between the hydrodynamic bearing of FIG. 3 and another hydrodynamic bearing.

FIGS. 1 and 2 illustrate a self-equalizing hydrodynamic thrust bearing 10 including a housing 14 and a plurality of pads 18 for interfacing with a surface 22 of a rotating component 26 (FIG. 4). In the illustrated construction, the bearing 10 is configured as a self-equalizing, tilting pad hydrodynamic thrust bearing 10 in which each of the pads 18 is independently adjustable relative to the housing 14 to create a self-sustaining hydrodynamic film of lubricant between each of the pads 18 and the rotating component 26. It should be understood that the physical characteristics of the lubricant used with the bearing 10 are not constrained to those of an incompressible fluid. With reference to FIG. 2, the bearing 10 includes a plurality of leveling links 30, 34 upon which the pads 18 are supported. Particularly, the pads 18 are directly supported by respective upper links 30, each of which is pivotably coupled to the housing 14 by a pin 38 (FIG. 3). The pin 38 includes a longitudinal axis 42 that is oriented substantially normal to a central axis 46 of the housing 14 which, in turn, is coaxial with the rotational axis of the rotating component 26. The bearing 10 also includes a plurality of lower links 34 upon which the respective upper links 30 are supported. The leveling links 30, 34 permit the respective pads 18 to roll about their respective radial axes 50 (FIG. 1) and slide over their corresponding upper links 30 to sustain the hydrodynamic film of lubricant between the pads 18 and the rotating component 26. Additional details regarding the structure and operation of tilting pad hydrodynamic bearings are found in U.S. Pat. No. 5,795,076, the entire content of which is incorporated by reference herein.

As shown in FIGS. 1 and 4, the bearing 10 includes two adaptive displacement pad assemblies 54 for controlling the thickness of the lubricant film that develops between the pad assemblies 54 and the rotating component 26. With reference to FIG. 1, the pad assemblies 54 are generally positioned one above the other and on the same side of the bearing 10 (i.e., on the same side of a vertical plane containing the central axis 46). Alternatively, the bearing 10 may include more or fewer than two pad assemblies 54.

Figure 5:
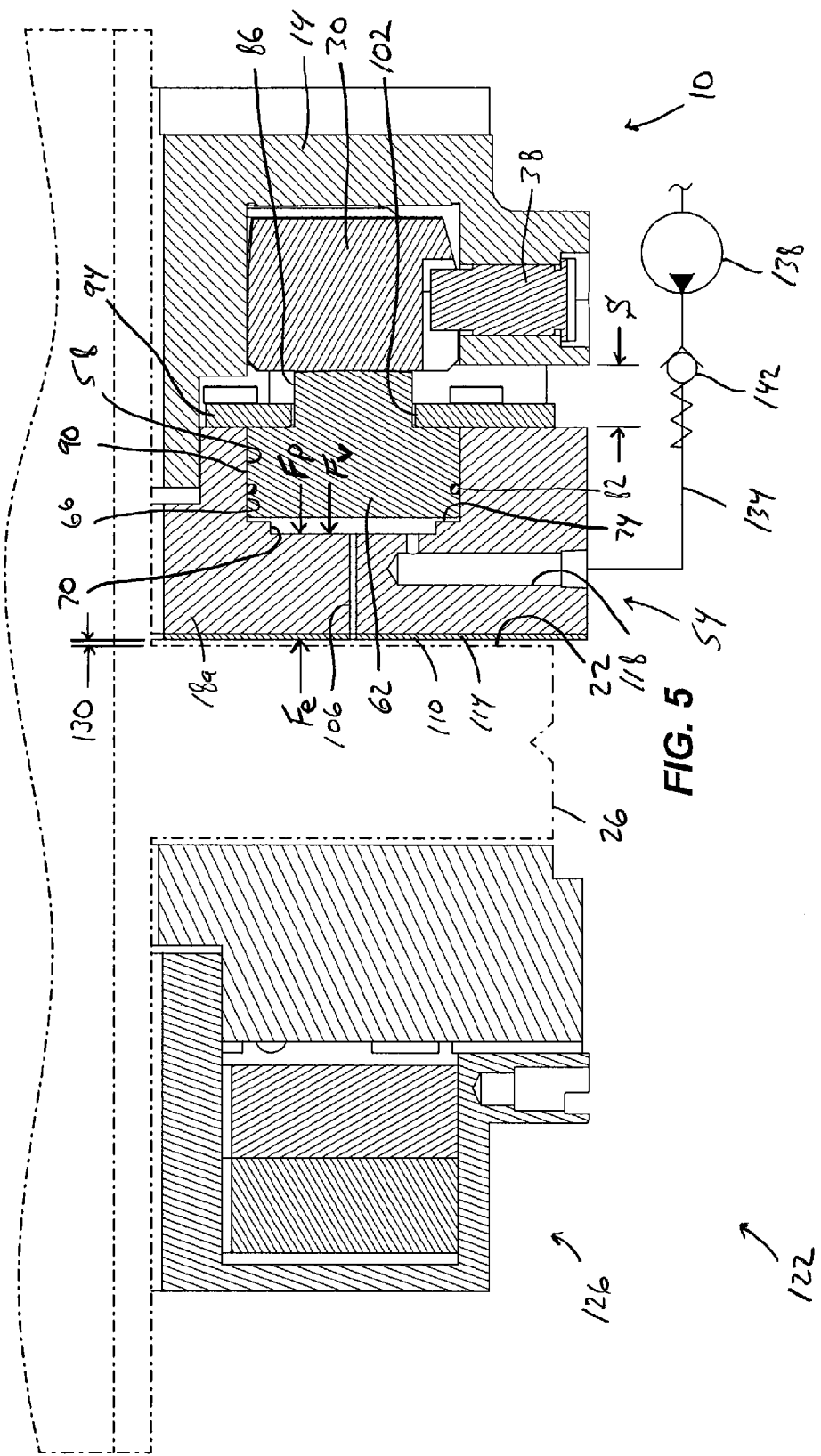
FIG. 5 is an enlarged, cross-sectional view of the hydrodynamic bearing assembly of FIG. 4, illustrating the piston in the hydrodynamic bearing of the present invention in an extended position.
Figure 6:
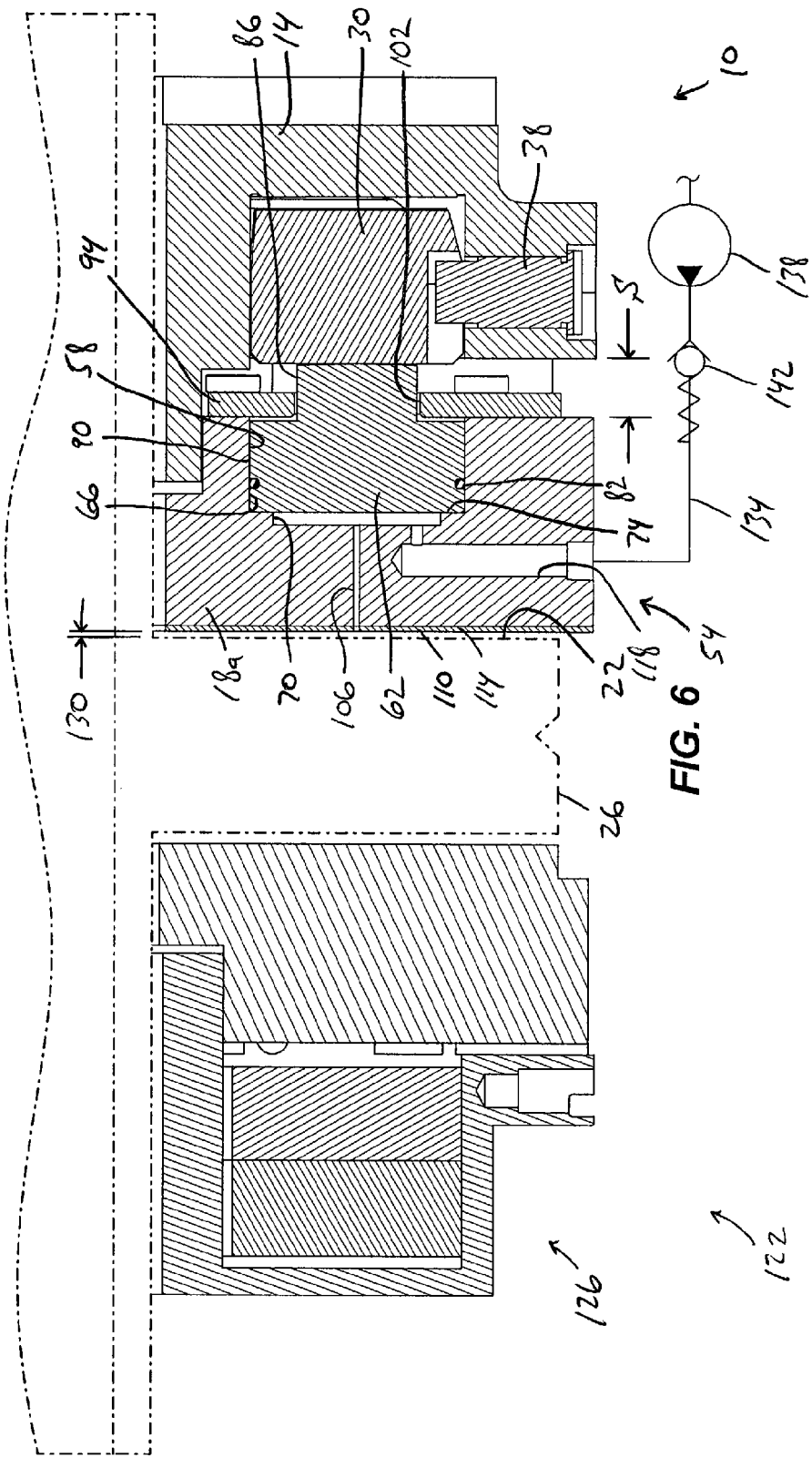
FIG. 6 is an enlarged, cross-sectional view of the hydrodynamic bearing assembly of FIG. 4, illustrating the piston in the hydrodynamic bearing of the present invention in a retracted position.

With reference to FIG. 3, each pad assembly 54 includes a pad 18a that is slidably adjustable relative to the housing 14 in a direction substantially parallel to the central axis 46. Each of the pads 18a defines a space or a cylinder 58 in which a piston 62 is at least partially positioned. The cylinder 58 defines a large-diameter portion 66 in which the piston 62 may reciprocate and an adjacent small-diameter portion 70. The cylinder 58 includes a step 74 separating the large and small-diameter portions 66, 70 of the cylinder 58. The piston 62 is abutted with the step 74 when the piston 62 is in a retracted position relative to the pad 18a (FIG. 6). With reference to FIGS. 5 and 6, the piston 62 includes a circumferential groove in which a mechanical seal 82 (e.g., an O-ring, a wiper seal, etc.) is positioned to inhibit the flow of lubricant between the piston 62 and the cylinder 58. The piston 62 also includes a small-diameter portion 86 extending from the cylinder, and a large-diameter portion 90 maintained within the large-diameter portion 66 of the cylinder 58.

With reference to FIG. 3, each pad assembly 54 includes a retaining plate 94 coupled to the pad 18a (e.g., using fasteners) to limit the axial travel or displacement of the piston 62. In the illustrated construction of the bearing 10, the piston 62 in each pad assembly 54 includes a step 98 separating the small-diameter portion 86 and the large-diameter portion 90, and the retaining plate 94 includes an aperture 102 through which the small-diameter portion 86 of the piston 62 extends. The retaining plate 94 engages the step 98 when the piston 62 is in an extended position relative to the pad 18a (FIG. 5). As such, a combination of the step 74 in the cylinder 58 and the retaining plate 94 limits the axial extent to which the pistons 62 are allowed to move within the respective cylinders 58. With reference to FIGS. 3, 5, and 6, the small-diameter portion 86 of each of the pistons 62 is engaged with the upper link 30 associated with the respective pads 18a in which the pistons 62 are positioned.

With reference to FIG. 3, each of the pad assemblies 54 also includes a lubricant port 106 defined in the pad 18a and in fluid communication with the cylinder 58. Particularly, one end of the lubricant port 106 is in fluid communication with the small-diameter portion 70 of the cylinder 58, while the opposite end of the lubricant port 106 is exposed to a bearing surface 110 of the pad 18a. The lubricant port 106 is unobstructed between the bearing surface 110 and the cylinder 58 to permit a bi-directional flow of lubricant through the lubricant port 106. In the illustrated construction of the bearing 10, the lubricant port 106 is oriented substantially parallel with the central axis 46. Alternatively, all or a portion of the lubricant port 106 may be obliquely oriented relative to the central axis 46 depending upon the desired radial location of the end of the lubricant port 106 exposed to the bearing surface 110 of the pad 18a. This end of the lubricant port 106 may be positioned in or proximate a region of the lubricant film having a relatively high pressure. As such, the lubricant ports 106 may assume any of a number of different shapes to communicate the cylinders 58 with one or more regions of the lubricant film having a relatively high pressure.

In the illustrated construction of the bearing 10, each of the pads 18a includes a separate, relatively thin compliant plate 114 on which the bearing surface 110 is defined. As such, a portion of the lubricant port 106 extends through the plate 114. Alternatively, the separate plate 114 may be omitted, and the lubricant port 106 may be defined entirely within the pad 18a.

With continued reference to FIG. 3, the pads 18a each include a second lubricant port 118 in fluid communication with the small-diameter portion 70 of the cylinder 58. However, the second lubricant port 118 is oriented substantially normal to the lubricant port 106 such that an inlet of the second lubricant port 118 is exposed to a surface of the pad 18a adjacent the bearing surface 110. As shown in FIG. 3, the lubricant port 106 includes a much smaller diameter than the lubricant port 118 to create a viscosity-induced resistance to the movement of the pads 18a (see paragraph 29 for additional detail). As is discussed in more detail below, during operation of the bearing 10, the pistons 62 are movable within the respective cylinders 58 between the retracted position (FIG. 6) and the extended position (FIG. 5) in response to a bi-directional flow of lubricant through one of the lubricant ports 106, 118 to vary an axial spacing S between each of the pads 18a and the housing 14.

With reference to FIG. 4, a hydrodynamic bearing assembly 122, including the tilting pad hydrodynamic thrust bearing 10 of FIGS. 1-3, is shown. Particularly, the assembly 122 includes the rotating component 26 positioned between the self-equalizing, tilting pad hydrodynamic thrust bearing 10 of the invention and a conventional, second tilting pad hydrodynamic thrust bearing 126. The bearing surface 22 of the rotating component 26 is in facing relationship with the bearing surfaces 110 of the respective pads 18a, to define therebetween a lubrication zone 130 in which lubricant is maintained (FIGS. 5 and 6). The assembly 122 may be contained within a housing (not shown) flooded with lubricant for use in creating the lubricant films between the rotating component 26 and the bearings 10, 126, respectively. Alternatively, lubricant may be pumped across the bearing surface 110 of each of the pads 18a to establish the lubricant film in operation of the assembly 122. Such a manner for pumping lubricant across the bearing surface of each of the pads in a tilting-pad hydrodynamic bearing is described in more detail in U.S. Pat. No. 5,795,076.

In operation of the assembly 122, the conventional, second tilting pad hydrodynamic thrust bearing 126 is configured to carry the thrust loading of the rotating component 26 during nominal continuous operation of the machinery in which the rotating component 26 is incorporated. Therefore, the conventional, second tilting pad hydrodynamic bearing 126 may be considered the "active" bearing 126 in the assembly 122. The tilting pad hydrodynamic thrust bearing 10 incorporating the pad assemblies 54, as a result, may be considered the "inactive" bearing 10 in the assembly 122 because its function is limited to carrying the transient thrust loads of the rotating component 26 when in operation. Alternatively, the conventional bearing 126 in the assembly 122 may be replaced with another bearing 10 of the invention.

With reference to FIG. 4, the assembly 122 also includes a lubricant supply passageway 134 with which the lubricant ports 118 in the respective pads 18a are in fluid communication. A pump 138 and a spring-loaded check valve 142 are positioned upstream of the lubricant supply passageway 134. The check valve 142 is biased to a closed position such that lubricant in the cylinders 58 is inhibited from leaking into the lubricant supply passageway 134. Prior to startup of the machinery incorporating the rotating component 26, any static axial load transmitted to the pads 18a is supported by the respective pistons 62, which are in the retracted position and abutted against the steps 74 in the respective cylinders 58.

Prior to startup of the machinery incorporating the rotating component 26, the pump 138 provides pressurized lubricant to the lubricant ports 118 via the check valve 142 and the lubricant supply passageway 134. The pressurized lubricant, in turn, enters the small-diameter portion 70 of each of the cylinders 58 and expands into the large-diameter portion 66 of the cylinders 58, pushing the pads 18a toward the bearing surface 22 of the rotating component 26 and effectively moving the pistons 62 toward the extended position within each of the cylinders 58 (FIG. 5). The pistons 62 continue to move within the respective cylinders 58 toward the extended position, if the operating conditions of the assembly 122 permit, until the steps 98 on the respective pistons 62 engage the retaining plates 94 at which time the pistons 62 are prevented from extending farther out of the respective cylinders 58. Any air or other gases trapped in the cylinders 58 prior to activating the pump 138 are purged through the respective lubricant ports 106 as the cylinders 58 are filled with lubricant.

After the pistons 62 are each moved to the extended position, the pump 138 is deactivated after the machinery incorporating the rotating component 26 has attained a suitable operating condition. The position of each of the pistons 62 may be detected by monitoring the pressure of the lubricant within the respective cylinders 58 (e.g., using a pressure transducer). For example, an increasing pressure within the cylinders 58 indicates that the cylinders 58 are being filled with lubricant, while a decreasing pressure within the cylinders 58 indicates that lubricant is leaving or exiting the cylinders 58. Either of these trends, considered with the change in pressure within the cylinders 58 over time, can be used to determine whether the pistons 62 are located in the extended position or the retracted position.

The check valve 142 inhibits the lubricant in the cylinders 58 from leaking back into the lubricant supply passageway 134. The pistons 62 are maintained within the respective cylinders 58 in the extended position, and the axial spacing S between the pads 18a and the housing 14 is maintained substantially constant while the transient axial loading or the external loading on each of the pads 18a (denoted "Fe" in FIG. 5) is less than the internal opposing force (denoted "Fp" in FIG. 5) on the pads 18a developed by the pressurized lubricant in the respective cylinders 58. The internal opposing force Fp on each of the pads 18a is equal to:

$$Fp = pA$$

where p is the pressure within each of the cylinders 58 and A is the projected area normal to the direction corresponding to the axis of circumferential symmetry of the pistons 62 upon which the pressurized lubricant acts.

When the external loading Fe on the pads 18a is less than the internal opposing force Fp on the pads 18a, the pistons 62 are maintained against the retaining plates 94 in the extended position within the respective cylinders 58. When the pistons 62 are in the extended position, the bearing surface 110 of each of the pads 18a is located at a distance from the bearing surface 22 of the rotating component 26 about equal to the minimum lubricant-film thickness that the thrust bearing pad 18a would ordinarily develop based on hydrodynamic principles. Accordingly, stiffness and damping of a non-negligible magnitude are added to the assembly 122, thus counteracting the axial movement of the rotating component 26 and attenuating the amplitude of the axial movement of the rotating component 26.

However, should the transient axial loading or the external loading Fe on each of the pads 18a exceed the internal opposing force Fp on the pads 18a, the rotating component 26 and the pads 18a will move toward the housing 14 (i.e., toward the right from the point of view of FIG. 5) with a resulting velocity to reduce the axial spacing S between the pads 18a and the housing 14. As the pads 18a move toward the housing 14, lubricant is forced out of the respective cylinders 58, through the lubricant ports 106, and into the lubrication zone 130 where the discharged lubricant becomes a part of the lubricant film between the rotating component 26 and the bearing 10. By forcing the lubricant in the respective cylinders 58 to flow through an orifice (i.e., the lubricant ports 106) having a relatively small diameter compared to either of the small-diameter or large-diameter portions 70, 66 of the cylinders 58, the pad assemblies 54 effectively function as a shock absorber or a damper by which the transient axial loading Fe on the pads 18a is attenuated. By attenuating the transient axial loading Fe on the pads 18a, any vibration of the rotating component 26 that is the source of the transient axial loading Fe is also attenuated.

Such a viscosity-induced resistance to the discharge of lubricant through the lubricant ports 106 results in the development of a force Fv opposing the motion of the pads 18a relative to the respective pistons 62 (FIG. 5). In the case of a viscous fluid, relatively small fluid velocities, and a relatively long, small-diameter duct (e.g., the lubricant port 106), a laminar flow condition can be assumed to yield the following relationship between the viscous force, Fv, and the linear axial velocity, Vp, of the pads 18a relative to the respective pistons 62:

$$Fv = CVp$$

where the proportionality term C is defined as the viscous damping coefficient and assumes, based on the above stated assumptions, the value:

$$C = 8\pi\mu L \frac{D^4}{d^4}$$

where $\mu$ is the absolute viscosity of the lubricant, D is the diameter of the cylinders 58 in which the respective pistons 62 are located, L is the axial length of the lubricant ports 106, and d is the diameter of the lubricant ports 106. If the relative velocity of the lubricant is large enough to produce turbulent flow in the lubricant ports 106, a non-linear relation of the damping coefficient may result. An inspection of the above equation for the viscous damping coefficient C suggests that the geometry of the cylinders 58 and the lubricant ports 106 in terms of the cylinder diameter, and the length and diameter of the lubricant ports 106, can be tuned for a given lubricant characteristic to satisfy the particular requirements of the rotating machinery incorporating the assembly 122.

The rotating component 26 and the pads 18a will continue to move toward the housing 14 as long as the external force Fe acting on each of the pads 18a is larger than the sum of the internal opposing force Fp and the viscous damping force Fv on the respective pads 18a. Upon reaching a balance between the external force Fe and the sum of the internal opposing force Fp and the viscous damping force Fv, the pads 18a stop moving relative to the respective pistons 62 and the housing 14, thereby leaving each of the pistons 62 somewhere between the extended position and the retracted position. If the pistons 62 engage the steps 74 in the respective cylinders 58 prior to achieving this balance, the axial movement of the rotating component 26 and the pads 18a stops (FIG. 6).

Should the rotating component 26 drift or move axially toward the active thrust bearing 126, lubricant in the lubricant zone 130 will flow through the lubricant ports 106 and into the small-diameter portion 70 of the respective cylinders 58 to fill the cylinders 58 as a result of a pressure differential between the ends of the lubricant ports 106. As lubricant fills the cylinders 58, the pistons 62 are moved toward the extended position within the respective cylinders 58, causing the pads 18a to move in the same direction as the rotating component 26 (i.e., toward the left from the point of view of FIG. 6), therefore increasing the axial spacing S between the pads 18a and the housing 14. As such, the width of the lubricant zone 130, or the axial spacing between the respective bearing surfaces 22, 110 of the rotating component 26 and the pads 18a, is maintained substantially constant while the rotating component 26 is moving toward the active bearing 126. By controlling the width of the lubricant zone 130 in this manner, (i.e., by not permitting the width of the lubricant zone 130 to increase and subsequently fill with lubricant) the parasitic power loss in the rotating machinery incorporating the assembly 122 is reduced because lubricant shearing, churning, and pumping losses are reduced.

Should the rotating component 26 then again drift or move axially toward the inactive bearing 10, the pads 18a will move with the rotating component 26 toward the housing 14 to maintain the width of the lubricant zone 130 as long as the transient external force Fe acting on each of the pads 18a exceeds the sum of the internal opposing force Fp and the viscous damping force Fv on the respective pads 18a as described above. It should be understood that the pad assemblies 54 will adapt the axial spacing S between the pads 18a and the housing 14 to maintain the width of the lubricant zone 130 and to automatically attenuate any excessive vibration of the rotating component 26 caused by transient reverse thrust loads on the rotating component 26 automatically without any input from the operator(s) or the control system of the rotating machinery incorporating the assembly 122.

An increase in the temperature of the rotating component 26 could cause the rotating component 26 to elongate. If the linear elongation of the rotating component 26 is free to develop in an unconstrained manner, then such an elongation will not yield an external force (e.g., Fe) on the pads 18a because the pistons 62 are free to move axially relative to the respective pads 18a. In this situation, the equilibrium among the axial external forces on the respective pads 18a that existed prior to the temperature-induced elongation of the rotating component 26 will be preserved, and the only significant effect deriving from the linear axial elongation of the rotating component 26 would be a reduction in the volume of the cylinder 58. Thus, in essence, each of the pad assemblies 54 will intrinsically adapt to the newly imposed operating conditions of the interfacing rotating component 26.

The adaptive displacement of the pad assemblies 54 as described above provides accurate positioning of the two opposed thrust bearings 10, 126 within a casing of the rotating machinery in which the assembly 122 is incorporated without the customary utilization of specifically ground shims that would otherwise be required during assembly to properly set the axial clearance between the respective bearing surfaces 22, 110 of the rotating component 26 and the inactive bearing 10.

Various features of the invention are set forth in the following claims.

What is claimed is:

1. A hydrodynamic bearing comprising:
   a housing defining a central axis;
   a pad slidable relative to the housing in a direction substantially parallel to the central axis and including a bearing surface;
   a cylinder defined in the pad;
   a lubricant port in fluid communication with the cylinder and exposed to the bearing surface; and
   a piston at least partially positioned in the cylinder, the piston being movable within the cylinder between a retracted position and an extended position in response to a bi-directional flow of lubricant through the lubricant port to vary an axial spacing between the pad and the housing, wherein the lubricant port is unobstructed between the bearing surface and the cylinder to permit the bi-directional flow of lubricant through the lubricant port.

2. The hydrodynamic bearing of claim 1, further comprising a retaining plate coupled to the pad against which the piston is abutted when in the extended position.

3. The hydrodynamic bearing of claim 2, wherein the retaining plate includes an aperture, and wherein a portion of the piston extends through the aperture when in the retracted position and the extended position.

4. The hydrodynamic bearing of claim 3, further comprising a link positioned within the housing against which the piston is engaged, wherein the link is pivotably coupled to the housing.

5. The hydrodynamic bearing of claim 4, further comprising a pin pivotably coupling the link and the housing, wherein the pin includes a longitudinal axis oriented substantially normal to the central axis.

6. The hydrodynamic bearing of claim 1, wherein the lubricant port is configured to permit the flow of lubricant into the cylinder in a first direction in response to the piston moving from the retracted position to the extended position, and wherein the lubricant port is configured to permit the flow of lubricant from the cylinder in an opposite, second direction in response to the piston moving from the extended position to the retracted position.

7. The hydrodynamic bearing of claim 1, wherein the lubricant port is at least partially defined by the pad.

8. The hydrodynamic bearing of claim 7, wherein the lubricant port is a first lubricant port, wherein the hydrodynamic bearing further includes a second lubricant port in fluid communication with the cylinder, and wherein the second lubricant port is exposed to a surface of the pad adjacent the bearing surface.

9. A hydrodynamic bearing assembly comprising:
   a rotating component including a first bearing surface; and
   a hydrodynamic bearing including
      a housing defining a central axis,
      a pad slidable relative to the housing in a direction substantially parallel to the central axis and having a second bearing surface in facing relationship with the first bearing surface, the first and second bearing surfaces defining therebetween a lubrication zone in which lubricant is maintained,
      a cylinder defined in one of the housing and the pad,
      a lubricant port in fluid communication with the cylinder and the lubricant zone, and
      a piston at least partially positioned in the cylinder, the piston being movable within the cylinder between a retracted position and an extended position in response to a bi-directional flow of lubricant through the lubricant port to vary an axial spacing between the pad and the housing, wherein the lubricant port is unobstructed between the second bearing surface and the cylinder to permit the bi-directional flow of lubricant through the lubricant port.

10. The hydrodynamic bearing assembly of claim 9, wherein the cylinder is defined in the pad.

11. The hydrodynamic bearing assembly of claim 10, further comprising a retaining plate coupled to the pad against which the piston is abutted when in the extended position.

12. The hydrodynamic bearing assembly of claim 11, wherein the retaining plate includes an aperture, and wherein a portion of the piston extends through the aperture when in the retracted position and the extended position.

13. The hydrodynamic bearing assembly of claim 12, further comprising a link positioned within the housing against which the piston is engaged, wherein the link is pivotably coupled to the housing.

14. The hydrodynamic bearing assembly of claim 13, further comprising a pin pivotably coupling the link and the housing, wherein the pin includes a longitudinal axis oriented substantially normal to the central axis.

15. The hydrodynamic bearing assembly of claim 10, wherein the lubricant port is at least partially defined by the pad.

16. The hydrodynamic bearing assembly of claim 15, wherein the lubricant port is a first lubricant port, wherein the hydrodynamic bearing further includes a second lubricant port in fluid communication with the cylinder, and wherein the second lubricant port is exposed to a surface of the pad adjacent the bearing surface.

17. The hydrodynamic bearing assembly of claim 9, wherein the lubricant port is configured to permit the flow of lubricant into the cylinder in a first direction in response to the piston moving from the retracted position to the extended position, and wherein the lubricant port is configured to permit the flow of lubricant from the cylinder in an opposite, second direction in response to the piston moving from the extended position to the retracted position.

* * * * *